Feb. 6, 1940.                L. SUTHERLIN                 2,189,620
                       TUBE FOR MEASURING VOLTAGES
                       Filed April 14, 1938      2 Sheets-Sheet 1

WITNESSES:

INVENTOR
Lee Sutherlin.
BY
ATTORNEY

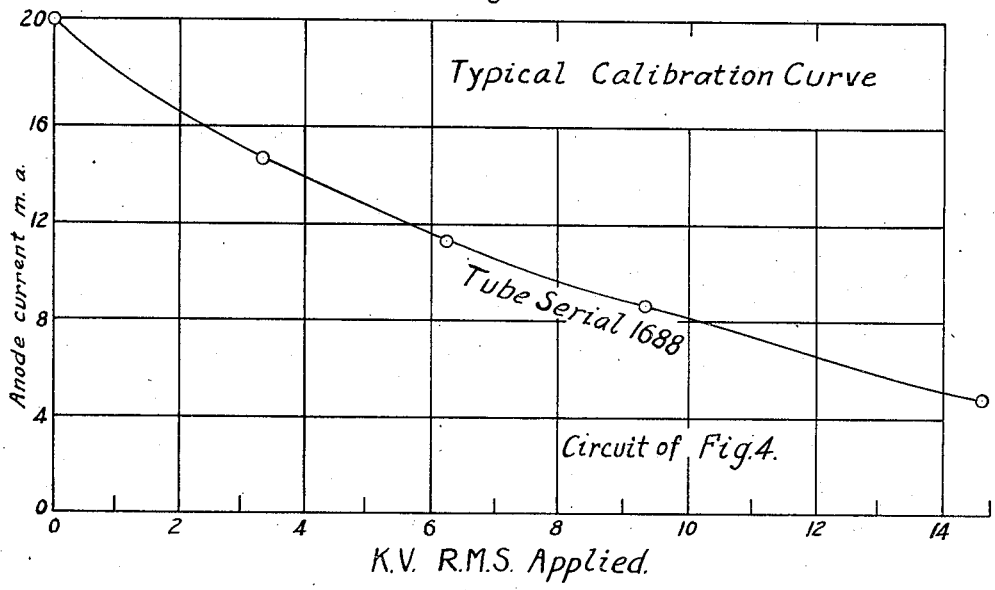
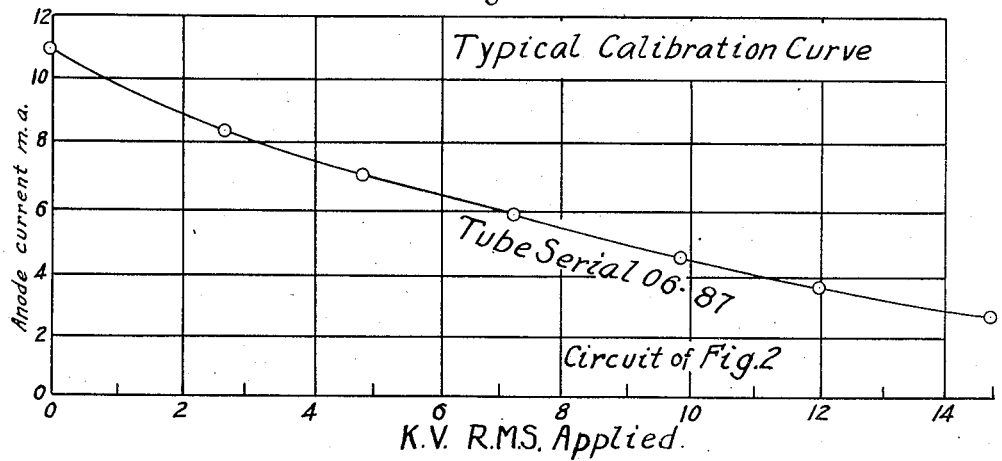

Patented Feb. 6, 1940

2,189,620

UNITED STATES PATENT OFFICE 2,189,620

TUBE FOR MEASURING VOLTAGES

Lee Sutherlin, Caldwell, N. J., assignor to Westinghouse Electric & Manufacturing Company, East Pittsburgh, Pa., a corporation of Pennsylvania Application April 14, 1938, Serial No. 201,956

4 Claims. (Cl. 171—95)

My invention relates to an instrument for measuring high voltages and in particular to an instrument for the purpose which uses vacuum tubes having at least three electrodes. In possibly a broader aspect, my invention may be considered to consist in a three-electrode tube for purposes of deamplification; that is to say, for causing an effect of large magnitude to produce an effect always proportional thereto but of materially smaller magnitude.

One object of my invention is to provide means for measuring extremely high voltages by means of electrical instruments designed for circuits of very much smaller voltage.

Another object of my invention is to provide an arrangement by which electrical phenomena in extremely high voltage circuits may produce corresponding phenomena, bearing a predetermined ratio thereto, in electrical circuits of much lower voltage. For instance, relays incorporated in a relatively low voltage circuit may be made responsive to effects occurring in circuits of extremely high voltage.

Still another object of my invention is to provide an electron tube in which currents in an output circuit are made to vary in reduced proportion to current or voltage variations in its input circuit.

Still another object of my invention is to provide electron tubes for performing the functions described in the preceding paragraphs of such a structure that the current variations in the output circuit are an accurate reproduction of the current or voltage variations of the input circuit.

A further object of my invention is to provide a three-electrode tube for the purposes outlined above of such a structure that electric charges collecting on the wall of the envelope shall not interfere with current flow between the three electrodes within the tube.

Other objects of my invention will become apparent from reading the following specification taken in connection with the drawings, in which:

Fig. 6 and Fig. 7 are calibration curves illustrating the electrical properties of the above-mentioned tubes and circuits and which will be further referred to in connection with the following detailed description.

It has been customary in the art of voltage measurement, to place an indicating instrument, which is essentially a galvanometer element, in series with a high resistance of such magnitude that the current flowing at the voltage of the circuit through the galvanometer element will deflect the latter to only that degree necessary to produce proper scale readings. For direct current circuits, even of fairly high value, such arrangements have not been unsatisfactory; but, when the voltages to be measured become extremely high, the enormously high resistance which it is necessary to provide in series with the galvanometer element becomes a source of both difficulty and expense. In the case of alternating current circuits, it has been possible to connect the primary of an instrument transformer to the high voltage source and to connect the galvanometer element in the transformer secondary; but in the case of the extremely high voltage circuits which it has become desirable to use, the expense of such transformers becomes a material burden.

In accordance with my invention, the use of such expensive high resistances or such instrument transformers in series with a galvanometer element is made unnecessary by connecting the high voltage circuit between an auxiliary electrode and a cathode of a three-electrode tube, and connecting the indicating instrument together with a source of low voltage (usually but not in all cases desirable) between a third electrode and the cathode. It is usually desirable to make the three-electrode tube of the high-vacuum type; that is to say, it is evacuated to such a degree that only a negligible part of the current between the electrodes is transported by gaseous ions. By positioning the electrode to which the high voltage circuit is connected at a relatively great distance from the cathode, while the space separating the electrode to which the low voltage circuit is connected is relatively close to the cathode, an arrangement is produced in which relatively large voltage changes in the high voltage circuit produce relatively small current changes in the low voltage circuit. In other words, the device may be said to act as a deamplifier.

The employment of an extremely high vacuum makes it possible to impose relatively large potential differences between the electrodes connected to the high voltage circuit without disruptive breakdown of the space intervening between them in the tube. However, it is found to be necessary to observe certain precautions in a tube of this type against such effects as the accumulation of negative charges on the insulating walls of the containing vessel. Such charges introduce irregularities in operation and relation between the current in the low voltage circuit and voltage variations in the high voltage circuit. I have found that it is possible to obviate the difficulties arising in this way by providing a conducting cylinder which shields the three electrodes from the glass walls of the tube.

Figure 1:
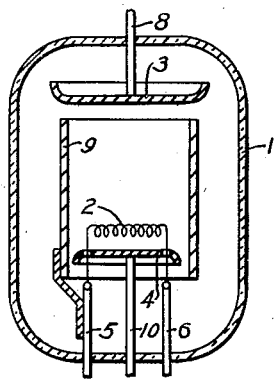
Figure 1 illustrates a tube of one form which embodies the features of my invention.

In correspondence with the foregoing principles, Figure 1 of the drawings shows a vacuum-tight enclosure 1, which may be of glass, quartz, or other suitable material, within which are positioned a cathode 2 which may be adapted to heat to such a temperature that it spontaneously emits electrons in substantial quantity, and two other electrodes 3, 4 which may be of nickel, molybdenum or other metal. Where the electrode 2 is to be directly heated by electric current, it is supported upon two in-leading wires 5, 6 which are sealed through the wall of the container 1, and which may conveniently be made to pass through holes in the electrode 4. The spacing between the in-leading wires 5, 6 and the electrode 4 should be made sufficiently great so that disruptive discharge will not occur between the two at the potential of the low voltage circuit.

The electrode 3 is preferably supported from a lead wire 8 sealed through the wall of the container at a point sufficiently distant from the leads 5, 6 so that potential of the high voltage circuit will not cause dielectric breakdown between them. The electrodes 2 and 4 are preferably enclosed within a cylindrical wall 9 of conducting material which may be supported if desired from one of the in-leading wires 5, 6 or alternatively may be supported upon a separate lead sealed through the wall of the container 1. The latter is preferably evacuated to the highest degree possible in modern high-vacuum practice. The electrode 4 may conveniently be supported on an in-leading wire 10 sealed through the wall of the container 1.

Figure 2:
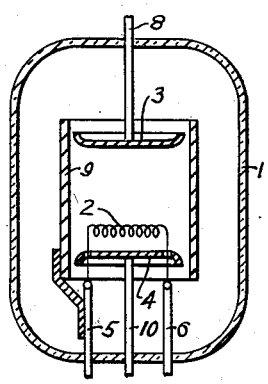
Fig. 2 illustrates a tube of a modified form for the same purpose.

Fig. 2, in which corresponding reference numerals indicate the same structural elements as in Fig. 1, differs from the latter only in that the electrode 3 is, like the electrodes 2 and 4, positioned within the confines of the shield 9.

Figure 3:
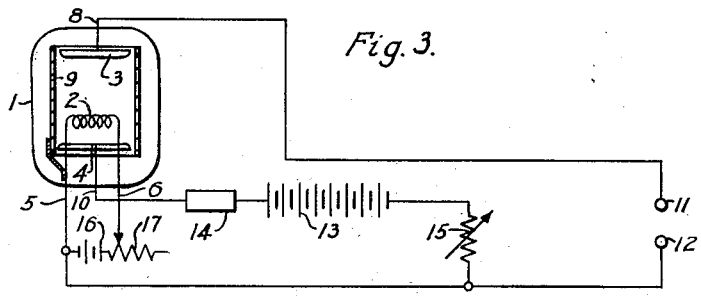
Fig. 3 illustrates a circuit suitable for employing either of the foregoing tubes for measuring the potential of an extremely high voltage circuit.

Fig. 3 illustrates a circuit in which either of the above described tubes is adapted to be employed for the measurement of the voltage of an extremely high voltage circuit, the terminals of which are illustrated at 11 and 12. As indicated, this circuit is connected between the cathode 2 and more distant electrode 3. Between the cathode and the electrode 4 is connected a circuit embodying a suitable low voltage source 13 and an indicating device or relay 14 and a suitable impedance 15. A voltage source 16 and a regulating impedance 17 may be provided for supplying the current to heat the cathode 2.

When a relatively high voltage is impressed between the terminals 11, 12, it will be found that a current of a certain magnitude will flow through the indicating device 14 and the magnitude of this current may be adjusted to a proper scale-value by varying the impedance 15, or if desired by varying the emissive power of the cathode 2 through adjustment of the impedance 17. One advantageous way of adjustment is to reduce the voltage between terminals 11—12 to zero and then vary the voltage of source 13 and/or resistor 15 to produce a full deflection on the instrument 14. If now the voltage upon the terminals 11, 12 varies, it will be found that the current through the indicating device 14 will vary correspondingly in the manner indicated by Fig. 6 in which the abscissae represent kilovolts applied to the terminals 11, 12 and the ordinates represent readings of a galvanometer-type instrument in the position 14. By employing such an instrumentality as an ordinary galvanometer with a high series resistance to measure the voltage 11, 12, the above described instrument arrangement may be calibrated in the laboratory and such a curve as Fig. 6 drawn. The arrangement may thereafter be used to read an unknown high voltage of the terminals 11, 12 directly from this calibration curve.

The foregoing statements apply regardless of whether the voltage impressed on the terminals 11, 12 is direct current or alternating current. Once calibrated for either, the calibration sheet will apply for the particular type of voltage.

Fig. 7 illustrates a typical calibration curve where the voltage applied to the terminals 11, 12 was of the direct current type. It would usually be desirable that the source 13 shall be of the direct current type and that the instrument 14 shall also be a direct current instrument. However, it is possible to employ a magnetic vane, hot wire, or other types of instrument than the galvanometer type at 14, should it be desired to do so.

Figure 4:
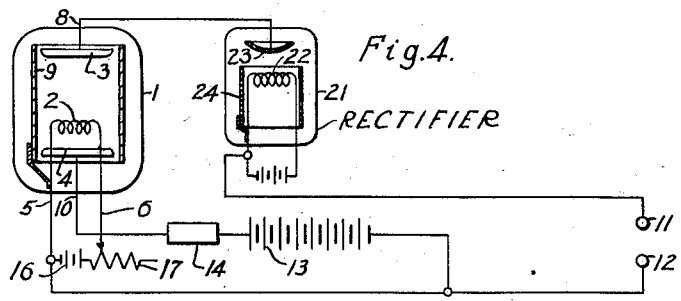
Fig. 4 illustrates still another circuit adapted to employ the said tubes for measuring purposes.

Fig. 4, in which the same reference numerals indicate the same circuit elements as in Fig. 3, shows an alternative circuit which may be used when the voltage source 11, 12 is of the alternating current type. In this circuit a rectifier tube 21 which may preferably be of the high vacuum incandescent cathode type is inserted in series with the high voltage anode 3. Such a rectifier tube may have an incandescent cathode 22 and anode 23 and if desired may be provided with a shield 24 surrounding the cathode, or, if desired, enclosing both the cathode and anode. Other types of rectifier, however, than that just described may be substituted under conditions which will be obvious to those skilled in the art. The rectifier 21 may be connected in the circuit with either polarity, but I prefer to connect it as indicated in Fig. 4 so that it freely conducts current on those half waves of the alternating voltage for which the tube 1 is non-conductive. Under these circumstances, the rectifier 21 acts as an impedance in the high voltage circuit passing only the charging current for its electrodes considered as plates of a condenser, and the leakage current due to such vehement gas ionization as may be present between these electrodes. In other words, the tube 21 makes it possible to dispense with any other series impedance in the high voltage line should it be desired to do so.

Where the voltage source 11, 12 is of the direct current type, it will usually be desirable to connect the negative terminal thereof to the electrode 3 of a tube of the type shown in Figs. 1 and 2 in which the electrode 4 is on the opposite side of cathode 2 from electrode 3. Under these circumstances the instrument 14 and the heating current supplied for cathode 2 are near the potential of the positive side of the direct current source 11, 12. Under these circumstances the tube 1 draws substantially no current from a direct-current line, and this is very important.

It is also important that the interelectrode capacity between electrode 3 and cathode 2 may be very small, say 1 micro-microfarad, and this makes the instrument accurate in measuring voltage surges of steep wave front.

Figure 5:
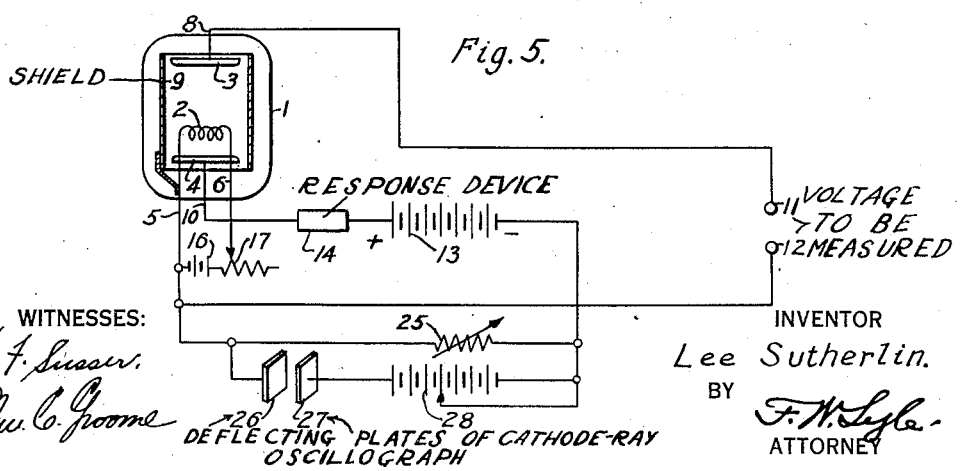
Fig. 5 shows a circuit adapted to employ the above-mentioned tubes in combination with a cathode ray tube as a measuring device.

Fig. 5 shows a circuit in which either of the tubes previously described is adapted to be used to take oscillographic records of the variations of the voltage across the terminals 11, 12. In this figure the same reference numerals denote the same circuit elements as in the other figures of the drawings. In Fig. 5, however, the lead between the cathode 2 and electrode 4 incorporates a variable resistor 25 shunted by a pair of deflecting plates 26, 27 of a cathode ray oscillograph tube. The control element of any other oscillograph may, of course, be substituted for the deflecting plates 27 just described, where desired. Cathode ray oscillograph tubes are so well known in the art as to need no separate description here. It will usually be desirable to provide a voltage source 28 in series with the oscillograph elements 26, 27 in shunt to resistor 25. The source 11, 12 may be either direct current or alternating current, the same principles applying as have already been mentioned in connection with Figs. 3 and 4.

While I have described the tube 1 as being provided with a conductive cylinder 9, the functions of the latter may obviously be performed even though the cylinder wall is perforated or composed of a wire screen. It is even possible to obtain fairly satisfactory operation with the member 9 omitted, if the enclosure 1 is made of sufficiently large diameter so that all portions of the walls are distant from the space intervening between the electrodes 2, 3 and 4.

In a typical illustration of a system embodying the principles of my invention, the tube 1 may be a high vacuum tube, the glass bulb approximately 2½ inches in diameter and 6½ inches long, having a cathode 2 comprising a tungsten filament requiring approximately 2 amperes at 5 volts to raise it to incandescence and 1¾ inches of wire spiralled over .050 inch mandril, the spiral being about ½ inch long. The electrode 4 may be of sheet nickel spaced approximately ⅛ inch below cathode 2. The electrode 3 may be of sheet nickel and positioned approximately 1¼ inches above cathode 2, and the cylinder 9 may be approximately 1¼ inches in diameter by 1½ inches long, with a space of approximately 3/32 inch intervening between it and the nearest point of the control electrode 3. The source 11, 12 which is to be measured may be of the order of 50,000 volts, and if the condenser intervenes between it and the anode 3, the latter may be of approximately 10⁻⁴ microfarads. If instead of a condenser, a resistor is inserted in the lead between source 11 and anode 3, its value may be approximately 500 megohms. The source 13 may be of approximately 175 volts and the instrument 14 may be a milliammeter with a full scale deflection of 25 milliamperes. In the case of Fig. 4, the rectifier tube 21 may be a WL-579 rectifier rated at .01 ampere and 20,000 volts. In the circuit of Fig. 5, the resistor 25 may be 1000 ohms, the source 28 of approximately 25 volts and the oscillograph containing the plates 26, 27 may be a Du Mont type 148.

The foregoing description is intended to be illustrative of my invention, but the broad principles thereof are capable of embodiment in many modified forms which will be obvious to those skilled in the art. I accordingly intend my invention to be limited by construction only insofar as is made necessary by the terms of the following claims when viewed in the light of the prior art.

I claim as my invention:

1. In combination with a high potential voltage source and a low potential voltage source, a vacuum tight enclosure embodying a pair of electrodes spaced apart from each other together with a third electrode adapted to emit electrical particles of one polarity and materially nearer to one of said electrodes than to the other, an envelope of conducting material within which at least two of said electrodes are positioned, connections from said high potential voltage source to said third electrode and the more distant of said other electrodes, and connections including a current responsive device from said low voltage source to said third electrode and the nearer of said other electrodes.

2. In combination with a high potential voltage source and a low potential voltage source, a vacuum tight enclosure embodying a pair of electrodes spaced apart from each other together with a third electrode adapted to emit electrical particles of one polarity and materially nearer to one of said electrodes than to the other, a metallic shield within which at least two of said electrodes are positioned, connections from said high potential voltage source to said third electrode and the more distant of said other electrodes, and connections including a current responsive device from said low voltage source to said third electrode and the nearer of said other electrodes.

3. In combination with a high potential voltage source and a low potential voltage source, a vacuum tight enclosure embodying a pair of electrodes spaced apart from each other together with a third electrode adapted to emit electrical particles of one polarity and materially nearer to one of said electrodes than to the other, an envelope of conducting material within which at least two of said electrodes are positioned, means to adjust the potential of said envelope relative to said third electrode, connections from said high potential voltage source to said third electrode and the more distance of said other electrodes, and connections including a current responsive device from said low voltage source to said third electrode and the nearer of said other electrodes.

4. In combination with a high potential voltage source and a low potential voltage source, a vacuum tight enclosure embodying a pair of electrodes spaced apart from each other together with a third electrode adapted to emit electrical particles of one polarity and materially nearer to one of said electrodes than to the other, an envelope of conducting material within which at least two of said electrodes are positioned connected within said enclosure to said third electrode, connections from said high potential voltage source to said third electrode and the more distant of said other electrodes, and connections including a current responsive device from said low voltage source to said third electrode and the nearer of said other electrodes.

LEE SUTHERLIN.